United States Patent Office 3,241,982
Patented Mar. 22, 1966

3,241,982
DRYING MEAT
Joseph L. Shank, Tinley Park, Ill., assignor to Swift & Company, Chicago, Ill., a corporation of Illinois
No Drawing. Filed May 26, 1961, Ser. No. 112,760
5 Claims. (Cl. 99—208)

The present invention relates in general to drying of food and more particularly to a novel method of drying meat whereby a new and improved product is produced.

Food drying by various means is extremely old and was probably first practiced as a means to preserve the food. Space and weight reduction of dehydrated foods is great and gives added reason for drying the food. The primary method of drying foods is to treat them with heat for a sufficiently long time to lower the moisture content to the desired level. This can be accomplished, for example, by sun drying or drying in hot air ovens. Vacuum drying is also employed. In certain instances temperature and humidity must be carefully controlled.

Case hardening is a problem confronting the manufacturer of dried foods and is especially acute in the field of meat drying. For example, when fresh meat is dried directly in hot air the surface dries first, thereby interfering with subsequent evaporation of moisture from the interior of the meat. This surface drying or case hardening produces a meat product which is often "gummy" in texture and which has very poor rehydration properties. For example, the appearance, texture, and palatability of a rehydrated, case hardened product are less than desirable and the rehydrated product is often not equal in weight to the initial fresh product due to its inability to readily absorb moisture through the hardened surface.

Attempts have been made to avoid the problem of case hardening. One such attempt involved abstraction of large amounts of water from foods, especially vegetables, by displacement with solutions of successively increasing proportions (e.g. 30–60–80%) of a strongly hydrophilic material at room temperature. Examples of such hydrophilic materials are glycerol, glucose, urea, and amino acids. Before the rate of absorption of the solution of hydrophilic material exceeds the rate of water loss, the food is removed from the solution, drained, and further dehydrated to the desired moisture content by oven drying or vacuum drying. While vegetables dried in the above manner appear to be quite free from case hardening, have generally good organoleptic properties and rehydrate to a greater extent than the conventionally dried product, the percentage of rehydration is usually less than 75% of the original weight of the product. Other attempts to eliminate case hardening have involved exacting humidity requirements in the drying zone. It is a principal object of my invention to provide a dried food product having improved and unique rehydration properties.

A further object of the invention is to provide a method for producing a dried food product which is free from case hardening and has improved rehydration properties.

An additional object of this invention is to produce a dried meat product having a controlled moisture content and a rehydration ratio substantially greater than one.

Further objects and advantages of my invention will be apparent to those skilled in the art from the following description.

I have discovered that by impregnating an amount of food, such as meat, with a minor amount of an edible colloid prior to drying, the food may thereafter be dried directly in hot air without developing case hardening. Moreover, the product formed has excellent flavor and texture characteristics and, in some instances, almost doubles its weight or reconstitution with liquid. The food may be impregnated with colloid by cooking it in a dilute solution of the colloid for a time sufficient to impregnate the food with the desired amount of colloid.

The minor amount of colloid which is impregnated in the meat is sufficient to coat each surface film or fiber area with a film of the colloid through which moisture diffuses during the hot air drying. This colloidal film prevents excessive desiccation of the meat surface itself thereby preventing case hardening and insuring easy reconstitution when the meat is rehydrated. The colloidal film also facilitates the departure of moisture from the meat so as to produce a desiccated product having a substantially uniform moisture content throughout.

Preferably the meat to be dried is sliced to develop thin sheets or strips; for example, sheets ⅛–¼ inch thick are especially suitable. Thicker sheets or slices are operable, particularly up to about ½–¾ inch thick, but of course length of time in the drier is correspondingly increased. A convenient method of preparing the slices of meat is to first soft-freeze the meat to give it body and minimize juice loss during slicing and then cut sheets of the desired size and shape. Thinner slices of meat, e.g., down to about 1/16 inch, may be prepared, but the resulting dried product will be quite fragile, and of course the thinner the slice the less acute the problem of case hardening.

The sheets, strips or chunks are then cooked in a dilute solution of edible colloid. We have found that a cook solution containing about 1% colloid will completely prevent case hardening. Lesser amounts down to about 0.5% will often completely prevent case hardening and can be advantageously employed to substantially always give a definite decrease in case hardening and an increased rehydration ratio. Greater amounts of colloid up to about 6% or more, for example, can be used and will prevent case hardening and have excellent rehydration properties. However, when the concentration of colloid increases above about 2%, the colloid content of the dried product rises above about 10% (weight basis), which of course cuts down the protein content of the dried meat. Thus, the upper level of colloid may be governed by the upper level of colloid tolerable in the final product. We have found that about 2% colloid is the optimum level for good rehydration characteristics.

The cook solution may also contain flavoring ingredients, for example salt. If, for example, salt is added in the cook solution, loss of natural salt from the meat is substantially prevented. It will, therefore, be apparent that by controlling the salt content a low salt dried meat product can be produced by my method. Low salt content products are in demand for dietary purposes.

The major amount of the cook solution is water, although several batches of meat may be cooked in the same solution so that some meat juices, solids, etc. may be present in addition to the colloid and any added flavoring ingredients. The amount of solution per unit weight of meat is not particularly important, it being necessary only that the resultant broth not be too thick or too watery. Generally, about twice as much water as meat (weight basis) produces a very suitable solution.

The colloids that are useful in my invention are the edible film formers. Examples include, but are not limited to, gelatin, starch, and gum such as agar, locust gum, arabic pectins, gum Irish moss, gum tragacanth, carageenin, etc. The cooking time and temperature may be varied depending on the colloid used. For example, if gelatin is used, the cooking temperature is preferably reduced to about 120–125° F.

After the cooking operation which may involve about 1–2 hours cooking at 200–212° F. (or lower temperatures, especially if gelatin is used), the meat pieces are removed from the cook solution and deposited on a surface for drying. Drying screens are especially suitable.

It will be noted that as the colloid solidifies the meat pieces tend to adhere to the surface. The screen can then be placed in a hot air drier. Generally, time and temperature vary inversely with each other in the drying operation, temperatures above 160° F. hastening drying, and temperatures between about 190–220° F. being optimum for meat drying. We have found that humidity control in the ovens is not required in my novel method for drying food.

The meat pieces are removed from the ovens when dry and may be packaged, if desired. Generally, the oven drying will be complete in 45 minutes to 3 hours. The time will be dependent on the desired moisture content. In this process the meat product is considered "dry" when its moisture content falls between about 1 and about 7 percent.

The dried meat thus prepared will be substantially free from case hardening and will have a rehydration ratio greater than one and in many cases—particularly if the optimum amount of colloid is employed—about 1.8 or 1.9.

I have further found that a complete ready-for-use package of dried meat can be prepared by drying the broth formed after cooking the meat in the cook solution and incorporating the dried broth in the package, e.g., a foil or plastic pouch, with the meat. If this procedure is employed, it is preferred to concentrate the broth as, for example, by cooking two or three batches of meat in the same cook solution.

While foods generally can be dried in accordance with my method, I have found it to be especially effective in the drying of protein foods such as meat. By the term meat I intend to include the flesh of meat-bearing animals, poultry, and fish, whether fresh or cured.

The following examples are presented for the purpose of illustration only and are not to be construed as limiting the scope of the invention.

EXAMPLE I

A quantity of beef was soft frozen (about 30° F.), sliced in sheets about ¼ inch thick, and aliquot portions were cooked for 1½ hours at about 200° F. in water containing varying amounts of agar from 0.5–5.9%. A control cook was also run. The meat pieces were removed from the cooking solutions, placed on screens, and dried in a hot forced air drier maintained at 190–200° F. After about 2 hours when the moisture content was reduced to less than 5%, the meat was removed from the drier. The following comparative table gives the analysis of the products:

*Table I*

| Agar concentration used in cook water | Grams agar recovered from 10 grams of dried meat by aqueous extraction | Dry Basis | | Rehydration Ratio: gms. H₂O absorbed by 1gm. of dried meat |
| --- | --- | --- | --- | --- |
| | | Percent Agar | Percent Meat | |
| 0 | 0 | 0 | 100 | 1.2 |
| 0.5 | 0.25 | 2.5 | 97.5 | 1.3 |
| 1.0 | 0.40 | 4.0 | 96.0 | 1.6 |
| 2.0 | 1.00 | 10.0 | 90.0 | 1.8 |
| 3.0 | 1.35 | 13.5 | 86.5 | 1.9 |
| 5.9 | 2.20 | 22.0 | 78.0 | 1.8 |

The dried meat containing 1% or more agar in the cook solution showed no case hardening. The meat made with 0.5% agar was not completely free from case hardening, but was not unsatisfactory from an organoleptic standpoint and had better rehydration properties than the control. The control meat exhibited case hardening sufficient to be an undesirable product.

EXAMPLE II

Relatively thin pieces of ham, chicken, and white fish were each cooked for about an hour in a solution containing about 1% salt and 2% agar at temperatures maintained at about boiling. The meat pieces were then removed from the cook solution and dried in a hot air oven. None of the pieces exhibited case hardening and all had a rehydration ratio greater than 1.7. I noted, however, that with the ham, 1% salt was not sufficient to maintain the customary flavor. About 3% salt is required to maintain a desirable flavor balance between ham and the broth.

EXAMPLE III

The general formula of the cooking broth used in this experiment, based on one pound of meat, is as follows:

Agar _____ grams__ 19
NaCl _____ do____ 9
Water _____ pound__ 1

A batch of beef pieces, thinly sliced, were cooked for 1½ hours in a cook solution containing the above proportions of ingredients. It was found that the agar-salt broth after cooking contained much protein. Two more batches of beef slices were then successively cooked in the broth to concentrate the broth. The following table gives the analysis of the meat after oven drying and the broth:

*Table II*

| Sample | Percent Moisture | Percent Solids | Percent Fat | Percent Protein | Percent Agar | Percent Meat |
| --- | --- | --- | --- | --- | --- | --- |
| Dried Beef: | | | | | | |
| First Cook | 3.8 | 96.2 | 1.40 | 84.6 | 10 | 90 |
| Second Cook | 3.4 | 96.6 | 0.79 | 88.6 | 8 | 92 |
| Third Cook | 6.6 | 93.4 | 1.20 | 86.5 | 10 | 90 |
| Broth: | | | | | | |
| First Cook | 94.8 | 5.2 | 0.07 | 1.8 | 1.5 | |
| Second Cook | 93.5 | 6.5 | 0.03 | 2.1 | 1.1 | |
| Third Cook | 93.1 | 6.9 | 0.09 | 3.7 | 1.0 | |

The broth was subsequently dried and placed in the same package with the dried beef pieces. Upon reconstitution with hot water a very palatable meat and gravy mixture was produced. It was determined that if the broth were to be concentrated, a practical operational program would be three 300-pound cooks per batch.

EXAMPLE IV

Beef pieces were cooked for 2 hours in an aqueous solution containing 1% salt and 5% gelatin. The cook temperature was maintained at 120–125° F. The meat was separated from the broth and dried at 160° F. The product was dry in 2–3 hours and exhibited no case hardening.

EXAMPLE V

Strips of thin beef were cooked for about two hours in an aqueous solution containing 0.5%, weight basis, gum Irish Moss. The cook temperature was 212° F. After cooking the beef was separated from the broth and dried at 160–200° F. The product was dry in 45 minutes to one hour. No case hardening was exhibited.

EXAMPLE VI

A batch of dried beef was prepared by the method of Example V except that 0.5% gum tragacanth was substituted for the gum Irish Moss. The product was free from case hardening and exhibited good rehydration properties.

I have determined the average analysis of meat dried with the optimum level of 2% agar to be as follows:

*Table III*

Percent moisture _____ 3–4
Percent solids _____ 93–96
Percent protein _____ 70–86
Percent fat _____ 1–2
Percent agar _____ 8–10
Initial peroxide ME/K _____ 3–6
Rehydration ratio _____ 1.8–1.9
pH _____ 5.7–6.1

The product shows no case hardening and is an improved dried product possessing exceptional characteristics.

Obviously many modifications and variations of the invention as hereinbefore set forth may be made without departing from the spirit and scope thereof, and therefore only such limitations should be imposed as are indicated in the appended claims.

I claim:
1. A method of drying meat to prevent case hardening in the ultimately dried product which comprises: cooking said meat in a solution containing at least 0.5% edible colloid whereby to coat substantially the entire surface of said meat with a film of said colloid, separating the meat and solution, and drying said coated meat.

2. A method of drying meat to prevent case hardening in the ultimately dried product which comprises: preparing thin pieces of meat, cooking said pieces in a solution containing at least 0.5% edible colloid whereby to coat substantially the entire surface of said pieces with a film of said colloid, separating said pieces and solution, and reducing the moisture content of said coated pieces by the application of dry heat thereto whereby said pieces will have a controlled and substantially uniform moisture content throughout.

3. The method of claim 2 wherein the colloid is selected from the group consisting of gelatin, starch and edible gums, and the moisture content is reduced to less than about 7%.

4. The method of claim 2 wherein the colloid is agar.

5. A method of drying meat which comprises: preparing thin pieces of said meat, cooking said pieces for at least about one hour in a solution containing between about 1-2% agar, separating said pieces from said solution, and lowering the moisture content of said coated pieces to less than about 7% by the application of dry heat thereto whereby said pieces will have a substantially uniform moisture content throughout and will be substantially free from case hardening.

References Cited by the Examiner

UNITED STATES PATENTS

| | | | |
|---|---|---|---|
| 2,354,495 | 7/1944 | Bodenstein | 99—199 |
| 2,439,180 | 4/1948 | McKee et al. | 99—208 |
| 2,785,075 | 3/1957 | Malecki | 99—169 |
| 2,856,294 | 10/1958 | Brown et al. | 99—169 X |
| 2,876,160 | 3/1959 | Schoch et al. | 99—94 X |
| 3,010,831 | 11/1961 | Rivoche | 99—204 X |
| 3,031,313 | 4/1962 | Morgan et al. | 99—204 X |
| 3,114,639 | 12/1963 | Rivoche | 99—204 |

FOREIGN PATENTS 603,997    6/1948    Great Britain.

OTHER REFERENCES

"Food Technology" November 1957, pages 599 to 603, inclusive, article entitled Freeze-Dried Meat, by A. L. Toppel et al.

A. LOUIS MONACELL, *Primary Examiner.*

HYMAN LORD, *Examiner.*